United States Patent [19]

Chern

[11] Patent Number: 5,160,225
[45] Date of Patent: Nov. 3, 1992

[54] STRUCTURE OF A SELF-DRILLING THREADED INSERT FOR USE ON DRYWALL

[76] Inventor: T. P. Chern, 293 Pei Tun Road, Taichung, Taiwan

[21] Appl. No.: 752,186

[22] Filed: Aug. 23, 1991

[51] Int. Cl.$^5$ .................. F16B 13/04; F16B 37/12
[52] U.S. Cl. ........................ 411/30; 411/55; 411/178; 411/387; 408/203.5; 408/209
[58] Field of Search .................. 411/30, 31, 55, 60, 411/178, 386, 387, 395; 408/203.5, 207, 209

[56] References Cited

U.S. PATENT DOCUMENTS

| | | | |
|---|---|---|---|
| 86,674 | 2/1869 | Hunt | 408/209 |
| 126,366 | 4/1872 | Wills | 411/387 |
| 4,601,625 | 7/1986 | Ernst et al. | 411/395 |
| 5,039,262 | 8/1991 | Giannuzzi | 411/30 |

FOREIGN PATENT DOCUMENTS

| | | | |
|---|---|---|---|
| 1225529 | 9/1966 | Fed. Rep. of Germany | 411/395 |
| 231155 | 6/1925 | United Kingdom | 411/387 |

*Primary Examiner*—Neill R. Wilson

[57] ABSTRACT

A threaded insert for drywall with a structure comprises a cylindrical body which includes an axial entrance hole at one end, an axial cavity at the other end, a high auger disposed thereon, a low thread disposed between the auger, a pair of drilling bits, diametrically opposed to each other, attaching to the bottom periphery of the axial cavity and extending therefrom to terminate a separately attached drilling tip. Extending from the entrance hole through the cavity, the body includes an internal passage for the insertion of a threaded fastener and facilitating the expelling of dusts. The drilling tip are separable upon the advancement of the fastener driven through the internal passage. The low thread strengthens pull-out resistance while the insert installed in the wall.

3 Claims, 2 Drawing Sheets

STRUCTURE OF A SELF-DRILLING THREADED INSERT FOR USE ON DRYWALL

BACKGROUND OF THE PRESENT INVENTION

The present invention relates to threaded inserts, and more particularly to a structure of a threaded insert for use on drywalls or sheetrock.

Referring to FIG. 1, a first conventional threaded insert for use on drywalls comprises a cylindrical body 1, a flat drilling bit 2 formed on the front end of body 1 with three pointed spikes formed on the extreme end thereof, a flange 3 formed on the rear end of body 1, a thread 4 formed around the outer periphery of body 1, a bore 5 extending axially through body 1, and a roughly spoon shaped opening 6 formed on the base of drilling bit 2 and in communication with bore 5.

FIG. 2 shows the conventional threaded insert with a screw 7 inserted through bore 5 therein. The tip of screw 7 abuts spoon shaped opening 6 and causes drilling bit 2 to deflect laterally as the juncture of bit 2 with body 1 has been purposely weakened during manufacture.

This type of conventional threaded insert has several disadvantages which are enumerated hereunder.

1) As the drilling bit 2 has a comparable length with that of body 1, chips generated at the extreme end of the drilling bit 2 by the drilling procedure have a relatively long distance to travel before reaching bore 5, which often leads to clogging therein.

2) Also as a result of the length of drilling bit 2, the threaded insert may easily divert from the intended direction of travel during the drilling procedure.

3) As was mentioned above, the juncture of drilling bit 2 with body 1 has been purposely weakened during manufacture. However, this can often result in the premature breakage of drilling bit 2 during the drilling procedure, especially when drilling a wall material of relatively greater hardness.

4) If the threaded insert is used on a wall of a thickness greater than the length of the insert, the drilling bit 2 would remain embedded in the wall. A screw that is to be subsequently inserted into the insert would have difficulty in deflecting the drilling bit 2 and hence could not be fully inserted therein.

Referring to FIGS. 3 and 4, a second conventional threaded insert comprises an elongate, tapering body with a spiral threading formed thereon, a drilling tip 8 formed on the front end thereof, a flange formed on the rear end thereof, and a chip expelling hole 9 on the side thereof, adjacent to the drilling tip 8.

While this second type of conventional threaded insert has a more integral and sturdy structure than that of the first type described above, and lacks the extended drilling bit of the latter along with the disadvantages stemming from it, the position of the chip expelling hole 9 does not lead to efficient chip removal and is more prone to clogging than the first type of conventional threaded insert.

The threaded insert of the present invention, however, overcomes the deficiencies of the conventional threaded inserts described above with an improved structure as is fully described below.

SUMMARY OF THE PRESENT INVENTION

The threaded insert for use on drywalls has a first objective of providing a self-drilling insert that has a sturdy structure and is resistant to clogging, and a second objective of providing a self-drilling insert that has increased pull-out resistance.

The threaded insert of the present invention comprises a generally cylindrical body with a high thread and a low thread formed around the outer periphery of the cylindrical body, a flange formed on the rear end of the cylindrical body, a fluted and partially tapered bore formed through the axis of the cylindrical body, and a pair of congruent drilling bits with the shape of a conical arc sector formed on the front end of the cylindrical body and meeting at a common apex to form a tip.

The threaded insert can be drilled into a drywall with a manual or powered screwdriver with the chips created thereby passing through the spaces between the drilling bits and through the axial bore of the insert which is separated from the tip of the drilling bits by only a small distance.

The high and low threads around the outer periphery of the cylindrical body tap into the drywall when the insert is drilled into the drywall with the low thread augmenting the pull-out resistance of the insert provided by the high thread.

The axial bore has a tapered rear section that is widest at the rear entrance thereof adjacent to the flange and narrowest at a position slightly forward of the midpoint of the threaded insert, after which the taper section adjoins with a linear section of equal width extending to the front entrance of the bore.

After the drilling procedure has been completed and the flange of the insert abuts the drywall, a screw can be inserted into the insert with the thread thereon tapping the fluted inner wall of the linear section of the bore.

The tip of the screw can be inserted pass the position of the cutting bits causing them to separate at the tip and diverge laterally, embedding into to the drywall to further strengthen the bond between the insert and drywall.

As is readily apparent from the above, the first and second objectives of the present invention are obtained.

A BRIEF DESCRIPTION OF THE DRAWINGS

PREFERRED EMBODIMENT OF THE PRESENT INVENTION

Figure 5:
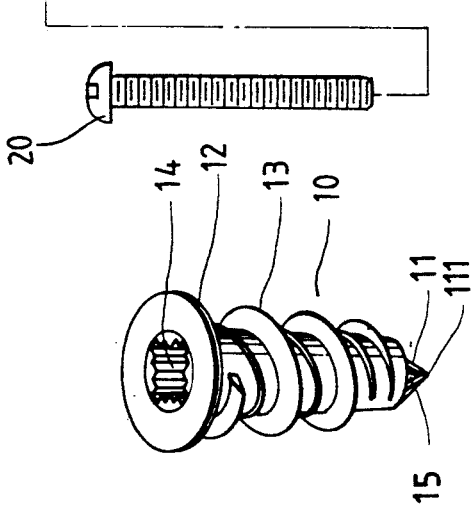
FIG. 5 is a perspective view of an embodiment of the self-drilling threaded insert of the present invention.

Referring to FIG. 5, the self-drilling insert of the present invention comprises a generally cylindrical main body with a flange 12 formed on the rear end thereof, a high thread 13 formed around the outer periphery of the main body, a low thread 16 formed around the outer periphery of the main body between high thread 13, a fluted and partially tapered central bore 14 formed through the axis of the main body, and a pair of drilling bits 11 formed on the front end of the main body.

Figure 6:
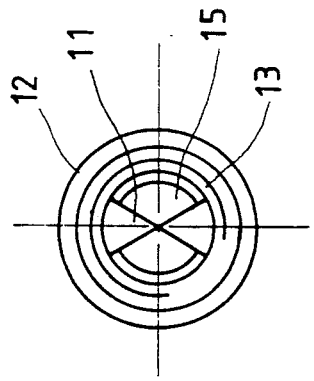
FIG. 6 is a front projection view of an embodiment of the self-drilling threaded insert of the present invention.
Figure 9:
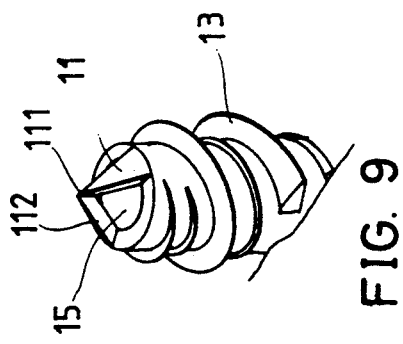
FIG. 9 is a perspective view of the front portion of an embodiment of the self-drilling threaded insert of the present invention.

Referring to FIGS. 6 and 9, the pair of drilling bits 11 have the shape of congruent conical arc sectors and meet at a common apex to define a tip 111 at the extreme forward end of threaded insert 10. A pair of cutting edges 112 are formed along respective edges of each drilling bit 11.

The shapes and relative positions of the pair of drilling bits 11 can best be described in geometrical terms as a pair of opposed arc sectors of a 60 degree cone defined by a pair of planes intersecting the cone and including the axis thereof, having a lesser angular separation of 45 degrees with the pair of arc sectors contained therebetween.

As such, the pair of spaces defined between the pair of drilling bits 11 would have a profile appearance of a pair of opposed circular arcs, with each circular arc subtending a 135 degree angle corresponding to the greater angular separation or supplementary angle between the pair of intersecting planes, as is apparent from the front projection view of FIG. 6.

The base of each drilling bit 11 adjoins with the front end of the main body with the pair of spaces therebetween in communication with the front entrance 15 of bore 14.

Figure 7:
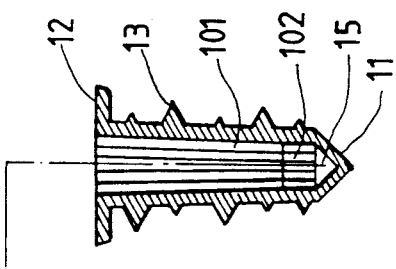
FIG. 7 is a sectional view of an embodiment of the self-drilling threaded insert of the present invention taken along the axis thereof.

Referring to FIG. 7, bore 14 has a rear taper section 101 adjacent to flange 12, and is at its widest thereat. Taper section 101 tapers and extends to a medial position between the midpoint of insert 10 and the front end thereof, to adjoin with a linear section 102 with a constant average width equal in cross-section with the adjoining narrow end of taper section 101.

Figure 1:
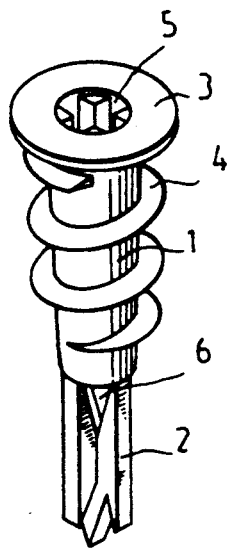
FIG. 1 is a perspective view of a first type of conventional self-drilling threaded insert of the prior art.
Figure 2:
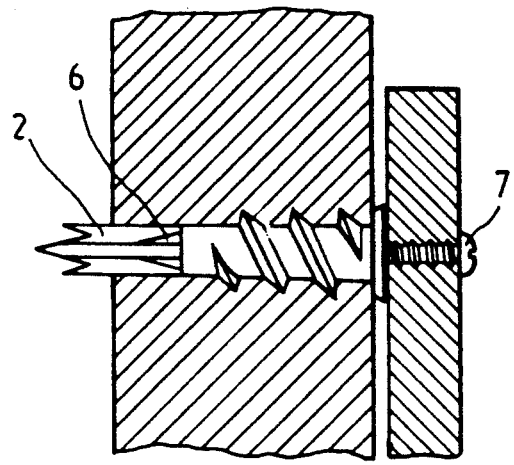
FIG. 2 is a side view showing a first type of conventional self-drilling threaded insert, embedded into a drywall and with a screw inserted therein, securing a partition board therebetween.
Figure 3:
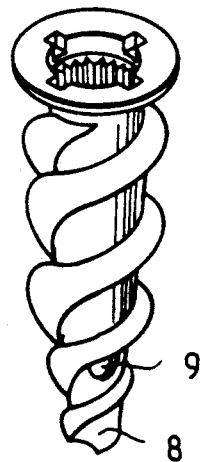
FIG. 3 is a perspective view of a second type of conventional self-drilling threaded insert of the prior art.
Figure 4:
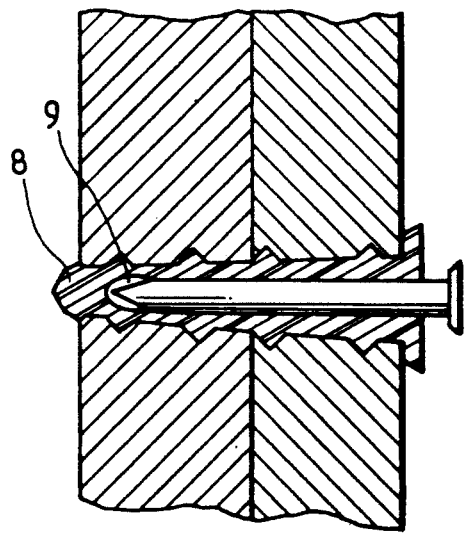
FIG. 4 is a sectional view showing a second type of conventional self-drilling threaded insert embedded into two layers of a wall, with a nail inserted therein.
Figure 8:
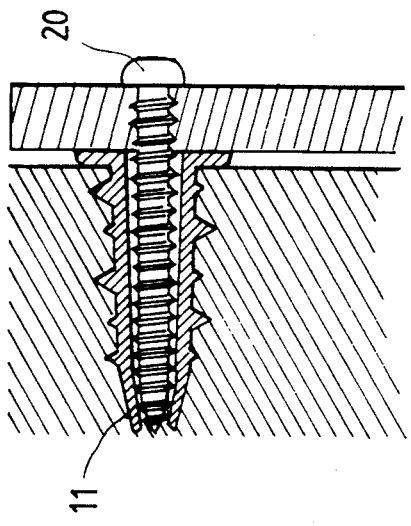
FIG. 8 is a sectional view showing an embodiment of the self-drilling threaded insert of the present invention embedded into a drywall with a screw inserted therein and securing a partition board therebetween.

Referring to FIG. 8, a threaded insert 10 has been drilled into a dry wall with the aid of a manual or powered screw driver. High and low threads, 13 and 16, have also tapped into the drywall to secure the insert 10 thereon.

A screw 20 is shown inserted through bore 14 of insert 10, with a partition board secured therebetween.

Screw 20 taps into the fluted inner wall of linear section 102 of bore 14 to secure therein, and extends past the position of the pair of drilling bits 11. The tip of screw 20 causes the pair of drilling bits 11 to separate at tip 111 and expand laterally outwards, embedding into the drywall to further strengthen the bond of insert 10 therewith.

Note that in comparison to the first conventional type of threaded insert described in the background, the threaded insert 10 of the present invention has drilling bits 11 that are relatively short and with cutting edges 112 thereon that are close to the front entrance 15 of bore 14. As such, the drilling bits 11 of the threaded insert 10 of the present invention are much less prone to premature breakage or clogging during the drilling procedure.

Also as a result of the reduced length and shape of drilling bits 11, the threaded insert 10 is much less likely to divert from the intended direction of travel during drilling.

Moreover, the conventional threaded insert as described above restricts the length of a screw to be inserted therein to a relatively narrow range, as the bore of the conventional threaded insert tapers continuously from the flange to the front entrance thereof with a screw tapping only the portion therein near the front entrance. Thus a screw must be at least long enough to reach the portion of the bore near the front entrance. If the threaded insert were drilled into a wall with a thickness comparable with or greater than the length of the insert, an inserted screw considerably longer than the body of the insert would have difficulty in deflecting the long drill bit for the reason mentioned in the background.

The linear section 102 within bore 14, extending a distance to the rear of front entrance 15 of the threaded insert 10 of the present invention, enables a relatively shorter screw to be used. A relatively long screw could also be inserted into insert 10 as the tip of the screw would have no difficulty in displacing drilling bits 11 when insert 10 is embedded into a wall of a thickness greater than the length thereof.

The threaded insert of the present invention can be manufactured in a single step by die casting from an appropriate metal, with specific types of zinc-aluminum alloy being particularly well suited.

Further modifications of the threaded insert of the present invention described above would occur to persons skilled in the art and all such modifications are deemed to be within the spirit and scope of the present invention as defined by the appended claims.

I claim:

1. A self drilling threaded insert for use on drywalls and the like comprising:
    a generally cylindrical main body with a flange formed on the rear end thereof;
    a high thread formed around the outer periphery of said main body;
    a low thread formed around the outer periphery of said main body, between said high thread;
    a fluted bore formed within said main body and extending axially therethrough, having a rear taper section adjacent to said flange and being widest thereat, said taper section extending and tapering to a medial position between the midpoint of said main body and the front end thereof to adjoin with a linear section of substantially constant width;
    at least two drilling bits formed on the front end of said main body with the shape of corresponding arc sectors of a cone, meeting at a common apex to define a tip and with the bases thereof adjoining with the front end of said main body, spaces defined between said drilling bits are in communication with the front entrance of said bore;
    whereby, said self drilling threaded insert can be drilled into a drywall with said high and low threads tapped therein, a screw can be inserted into said bore of said insert and tap into the inner wall thereof, the tip of said screw can extend past said drilling bits causing said drilling bits to separate at said tip and expand laterally outwards, possibly embedding into said drywall.

2. A self drilling threaded insert according to claim 1, wherein said drilling bits comprise a pair of congruent drilling bits with a shape and relative position corresponding with a pair of opposed conical arc sectors of an acute angled cone defined by a pair of planes intersecting said cone and including the axis thereof, said planes having an acute angular separation with said opposed conical arc sectors contained therebetween.

3. A self drilling threaded insert according to claim 1, wherein said threaded insert is manufactured from an alloy including zinc and aluminum.

* * * * *